(12) United States Patent
Weimar

(10) Patent No.: US 11,979,071 B2
(45) Date of Patent: May 7, 2024

(54) ELECTRIC DRIVE, BRAKING DEVICE, AND VEHICLE

(71) Applicant: Vitesco Technologies GmbH, Hannover (DE)

(72) Inventor: Jan Weimar, Munich (DE)

(73) Assignee: VITESCO TECHNOLOGIES GMBH, Hannover (DE)

(*) Notice: Subject to any disclaimer, the term of this patent is extended or adjusted under 35 U.S.C. 154(b) by 524 days.

(21) Appl. No.: 17/284,070

(22) PCT Filed: Oct. 10, 2019

(86) PCT No.: PCT/EP2019/077521
§ 371 (c)(1),
(2) Date: Apr. 9, 2021

(87) PCT Pub. No.: WO2020/074662
PCT Pub. Date: Apr. 16, 2020

(65) Prior Publication Data
US 2021/0384792 A1  Dec. 9, 2021

(30) Foreign Application Priority Data

Oct. 12, 2018 (DE) ..................... 10 2018 217 555.1

(51) Int. Cl.
*H02K 3/52* (2006.01)
*B60T 13/74* (2006.01)
(Continued)

(52) U.S. Cl.
CPC ............ *H02K 3/522* (2013.01); *B60T 13/745* (2013.01); *H02K 1/278* (2013.01); *H02K 7/083* (2013.01);
(Continued)

(58) Field of Classification Search
CPC ... F16D 2121/24; B60T 13/745; H02K 1/278; H02K 3/522; H02K 7/083; H02K 15/095; H02K 21/16; H02K 2203/09
(Continued)

(56) References Cited

U.S. PATENT DOCUMENTS 5,705,868 A    1/1998  Cox et al.
5,811,902 A *  9/1998  Sato ...................... F16C 25/083
                                                              310/90
(Continued)

FOREIGN PATENT DOCUMENTS

DE     102007061107     6/2008
DE     102010000710     7/2011
(Continued)

OTHER PUBLICATIONS

Office Action of the corresponding German Patent Application No. 10 2018 217 555.1.

*Primary Examiner* — Robert A. Siconolfi
*Assistant Examiner* — San M Aung
(74) *Attorney, Agent, or Firm* — Cozen O'Connor

(57) ABSTRACT

An electric drive for use in an electrohydraulic brake system, including a housing, a stator-rotor unit received by the housing for displacing a piston of a cylinder-piston arrangement to generate a brake pressure and a separate housing insert made of a plastic, which is joined to the housing and is electrically contacted with a stator of the stator-rotor unit. The housing insert encloses a contact arrangement of spaced-apart electrically conducting contact elements for the electrical supply of phases of a coil of the stator, wherein the contact elements are electrically insulated from one other by the plastic.

17 Claims, 9 Drawing Sheets

(51) Int. Cl.
*H02K 1/278* (2022.01)
*H02K 7/08* (2006.01)
*H02K 21/16* (2006.01)

(52) U.S. Cl.
CPC ......... *H02K 21/16* (2013.01); *H02K 2203/09* (2013.01)

(58) Field of Classification Search
USPC ......................................................... 188/358
See application file for complete search history.

(56) References Cited

U.S. PATENT DOCUMENTS

| | | | | |
|---|---|---|---|---|
| 2007/0241625 | A1* | 10/2007 | Terauchi | H02K 29/12 |
| | | | | 310/68 B |
| 2007/0278875 | A1* | 12/2007 | Haga | H02K 3/522 |
| | | | | 310/260 |
| 2008/0150377 | A1* | 6/2008 | Yamaguchi | H02K 3/522 |
| | | | | 310/43 |
| 2011/0006626 | A1 | 1/2011 | Kinugawa | |
| 2015/0114770 | A1* | 4/2015 | Arrigoni | B60T 13/745 |
| | | | | 188/106 F |

FOREIGN PATENT DOCUMENTS

| | | |
|---|---|---|
| DE | 112013005061 | 7/2015 |
| DE | 102015104444 | 10/2015 |
| DE | 102017211392 | 1/2018 |
| JP | 2017085756 | 5/2017 |
| WO | WO 2013168122 | 11/2013 |
| WO | WO 2018104418 | 6/2018 |

* cited by examiner

A)

B)

ELECTRIC DRIVE, BRAKING DEVICE, AND VEHICLE

CROSS REFERENCE TO RELATED APPLICATIONS

This is a U.S. national stage of Application No. PCT/EP2019/077521 filed Oct. 10, 2019. Priority is claimed on German Application No. DE 10 2018 217 555.1 filed Oct. 12, 2018 the content of which is incorporated herein by reference.

BACKGROUND OF THE INVENTION

1. Field of the Invention

The present disclosure relates to an electric drive, to a brake system with such an electric drive, and to a vehicle with such a brake system.

The proposed electric drive is intended for use in an electrohydraulic brake system, the electric drive driving a ball screw which, as such, displaces a piston of a cylinder-piston arrangement to generate a brake pressure.

2. Description of Related Art

A vehicle is to be understood here as meaning any type of vehicle that has to be supplied with a liquid and/or gaseous fuel for operation, but in particular passenger motor vehicles and/or utility vehicles. Furthermore, the vehicle may also be a partially electric or fully electric vehicle, but in particular a passenger motor vehicle and/or utility vehicle.

SUMMARY OF THE INVENTION

One aspect of the present invention is an electric drive for an electrohydraulic brake system that is as compact as possible and can also be produced and assembled as simply as possible. The electric drive is intended to be able to be produced as inexpensively as possible.

The contact elements have first contact sections for external contacting of the stator with a plug and second contact sections for internal contacting of the stator with the respective contact elements. These first and second contact sections are also referred to as contact pins or contact tabs.

According to one aspect of the present invention, the first contact sections and the second contact sections protrude in a longitudinal direction of the electric drive from the plastic of the housing insert from an end face of the housing insert facing away from the stator-rotor unit. This makes it possible to minimize a longitudinal extent of the electric drive.

According to a further aspect of the present invention, the housing insert is additionally connected to the stator in a form-fitting manner Individual pin-like anchoring sections—also called anchoring domes—made of plastic and integrally formed on the stator can extend in a longitudinal direction of the electric drive through respectively associated openings in the housing insert beyond an end face of the housing insert facing away from the stator-rotor unit and engage behind the end face. These plastic anchoring sections can be caulked with the housing insert. Caulking is to be understood here as meaning the production of a force-fitting and form-fitting connection between the respective anchoring section and the housing insert, the anchoring section being plastically deformed. There is therefore no need for an additional, separate element to fix the housing insert in relation to the stator. This also makes it possible to minimize the longitudinal extent of the electric drive.

According to a further aspect of the present invention, the housing insert additionally receives a bearing of a rotor of the stator-rotor unit in a centering manner and braces it. The housing insert can press against the bearing via a spring element, preferably in the form of an annular spring element, for example in the form of a corrugated spring, which is enclosed by the housing insert, to brace the bearing.

In a particularly advantageous embodiment of the present invention, the contact arrangement has three spaced-apart, electrically conducting contact elements for the electrical supply of three phases of the coil.

BRIEF DESCRIPTION OF THE DRAWINGS

Further advantageous developments of the present invention will emerge from the dependent claims and from the following description of preferred embodiments. In the drawings:

DETAILED DESCRIPTION OF THE PRESENTLY PREFERRED EMBODIMENTS

The disclosed electric drive 2 is intended for use in an electrohydraulic brake system. The electric drive 2 is designed as an electronically commutated, three-phase (phases U, V, W) direct current motor in the form of an internal rotor. The electric drive 2 comprises a housing 4, which is formed, for example, from a deep-drawn metal sheet and which can be attached to a housing of the electrohydraulic brake system via a flange 6. In the housing 4 there is installed a stator-rotor unit 18, 26 which drives a ball screw—not shown here—for displacing a piston of a cylinder-piston arrangement in order to generate a brake pressure.

In connection with an application other than the one proposed here, the electric drive proposed in the context of this description of the figures can also be operated as an electronically commutated alternating current motor.

Figure 1:
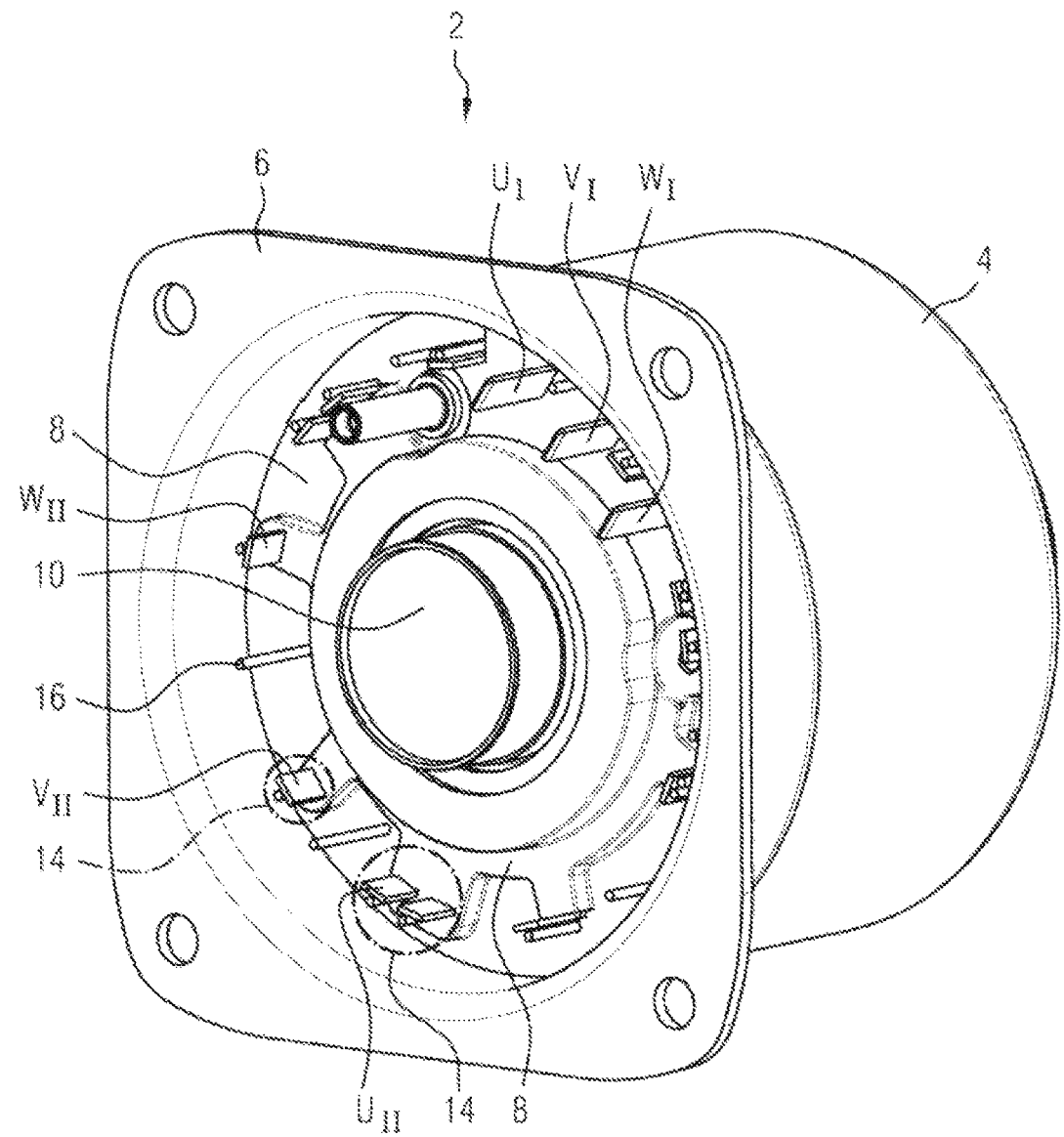
FIG. 1 is a perspective illustration of a proposed electric drive.

A separate, plastic-encapsulated housing insert 8 is also joined to the housing 4, through the central opening of which insert there extends a section 10 of a tube 28 of a rotor 26, in which said ball screw is arranged (cf. FIG. 1). In this context, "separate" means that the housing insert 8 is not part of the stator 18.

The housing insert 8 encloses a contact arrangement 22 of three spaced-apart, electrically conducting contact elements $KE_U$, $KE_V$, $KE_W$ (cf. FIG. 2 in conjunction with FIGS. 10A-10F), which are electrically insulated from one another by the plastic of the housing insert 8. Each of the contact elements $KE_U$, $KE_V$, $KE_W$ has a partially circular base section BA on which a single, first contact section $U_I$, $V_I$, $W_I$ and a total of four second contact sections $U_{II}$, $V_{II}$, $W_{II}$ are integrally formed (cf. FIGS. 10A-10F).

Figure 6:
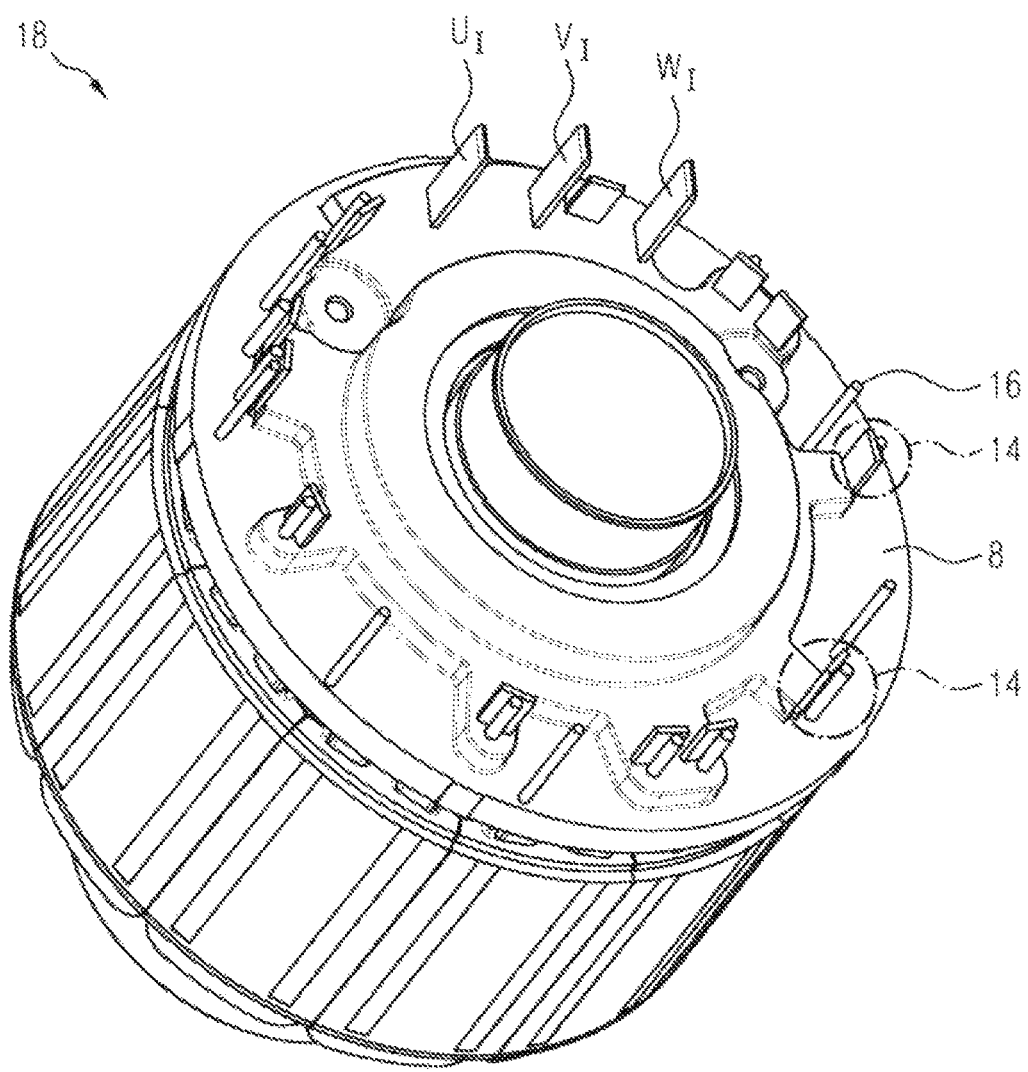
FIG. 6 is a further perspective illustration of the housing insert shown in FIG. 1 together with the coil shown in FIG. 4.

Both the first contact sections $U_I$, $V_I$, $W_I$ and the second contact sections $U_{II}$, $V_{II}$, $W_{II}$ protrude from an end face of the housing insert 8 facing away from the stator-rotor unit 18, 26. Furthermore, individual wire ends $D_B$, $D_E$ of a coil 20 of a stator 18 are routed through associated openings in the housing insert 8 to the outside through the housing insert 8, so that these wire ends also protrude from the end face. Here, a wire end means either a wire beginning $D_B$ (B=beginning) or a wire end $D_E$ (E=end) of a wire winding $DW_U$, $DW_V$, $DW_W$ of the coil 20. In the exemplary embodiment, a total of 6 wire windings form the coil 20. These wire ends are contacted with the respectively assigned second contact sections $U_{II}$, $V_{II}$, $W_{II}$. The wire ends can be connected to the respective contact sections $U_{II}$, $V_{II}$, $W_{II}$ in an integrally bonded manner by resistance welding (cf. connection 14 in FIG. 1 or FIG. 6).

The first contact sections $U_I$, $V_I$, $W_I$ serve for externally contacting the stator 18 with a plug. By contrast, the second contact sections $U_{II}$, $V_{II}$, $W_{II}$ serve for internally contacting the stator 18 with the three contact elements $KE_1$, $KE_2$, $KE_3$ (cf. FIG. 2 in conjunction with FIGS. 10A-10F), each of which is assigned to one of three phases U, V, W of the coil 20.

The contact sections $U_{II}$, $V_{II}$, $W_{II}$ are assigned in pairs to a coil section, that is to say to a beginning of a wire winding $DW_U$ and to an end of a wire winding $DW_V$, $DW_W$ adjacent thereto, with the coil section belonging to one of the phases U, V, W of the coil 20. The mutually opposite pairs of the contact sections $U_{II}$, $V_{II}$, $W_{II}$ each contact a coil section belonging to the same phase U, V or W (cf. FIGS. 10A-10F). The division of the contact elements $KE_U$, $KE_V$, $KE_W$ can be such that the spacing between the mutually assigned contact sections $U_{II}$, $V_{II}$, $W_{II}$ differs (cf. FIGS. 10A-10F). In principle, however, this spacing can also be identical, provided that the wire ends $D_B$, $D_E$ of the coil 20 are routed away accordingly.

Figure 2:
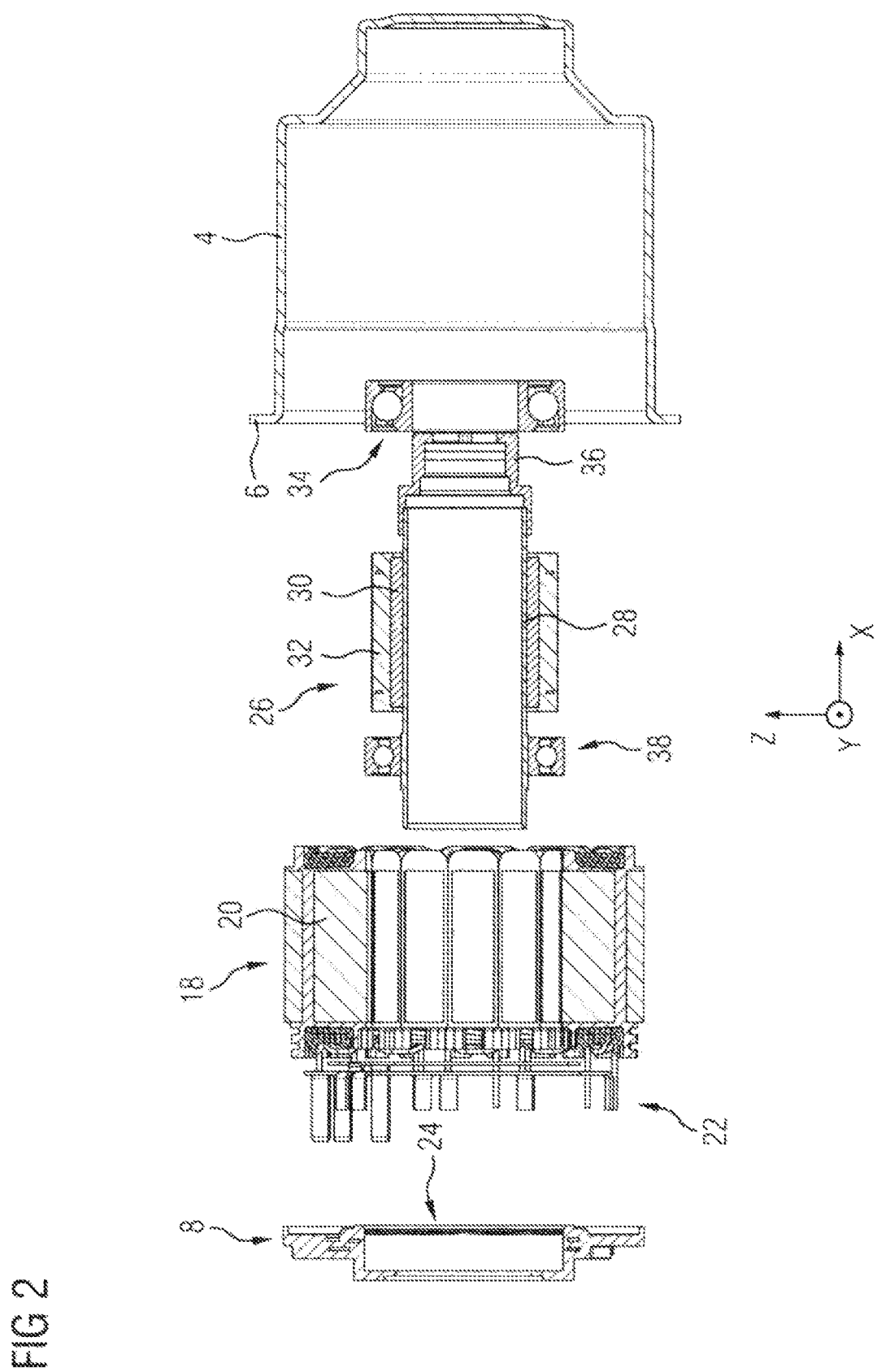
FIG. 2 is an exploded illustration of the electric drive shown in FIG. 1.
Figure 4:
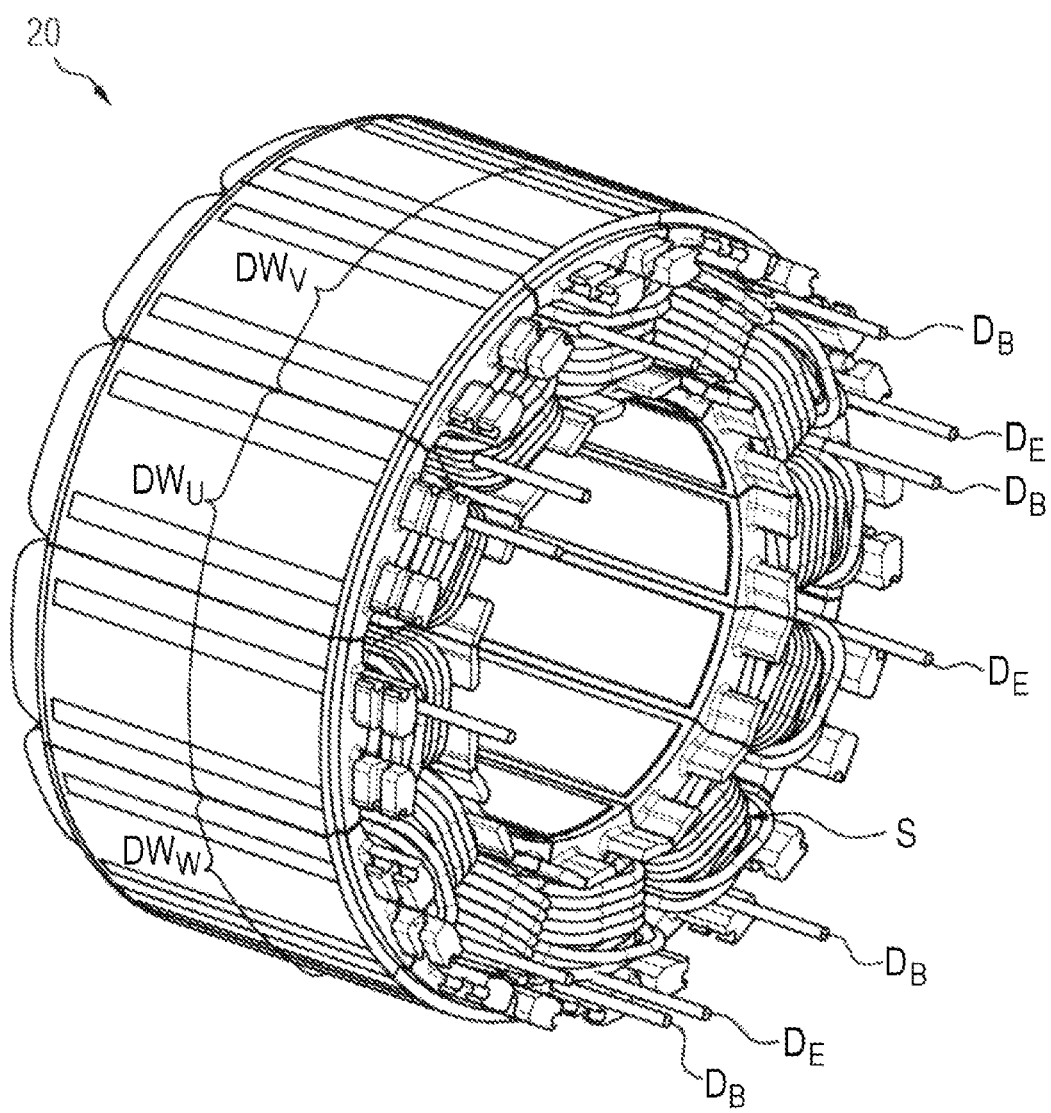
FIG. 4 is a perspective illustration of a coil of the electric drive shown in FIG. 1.
Figure 5:
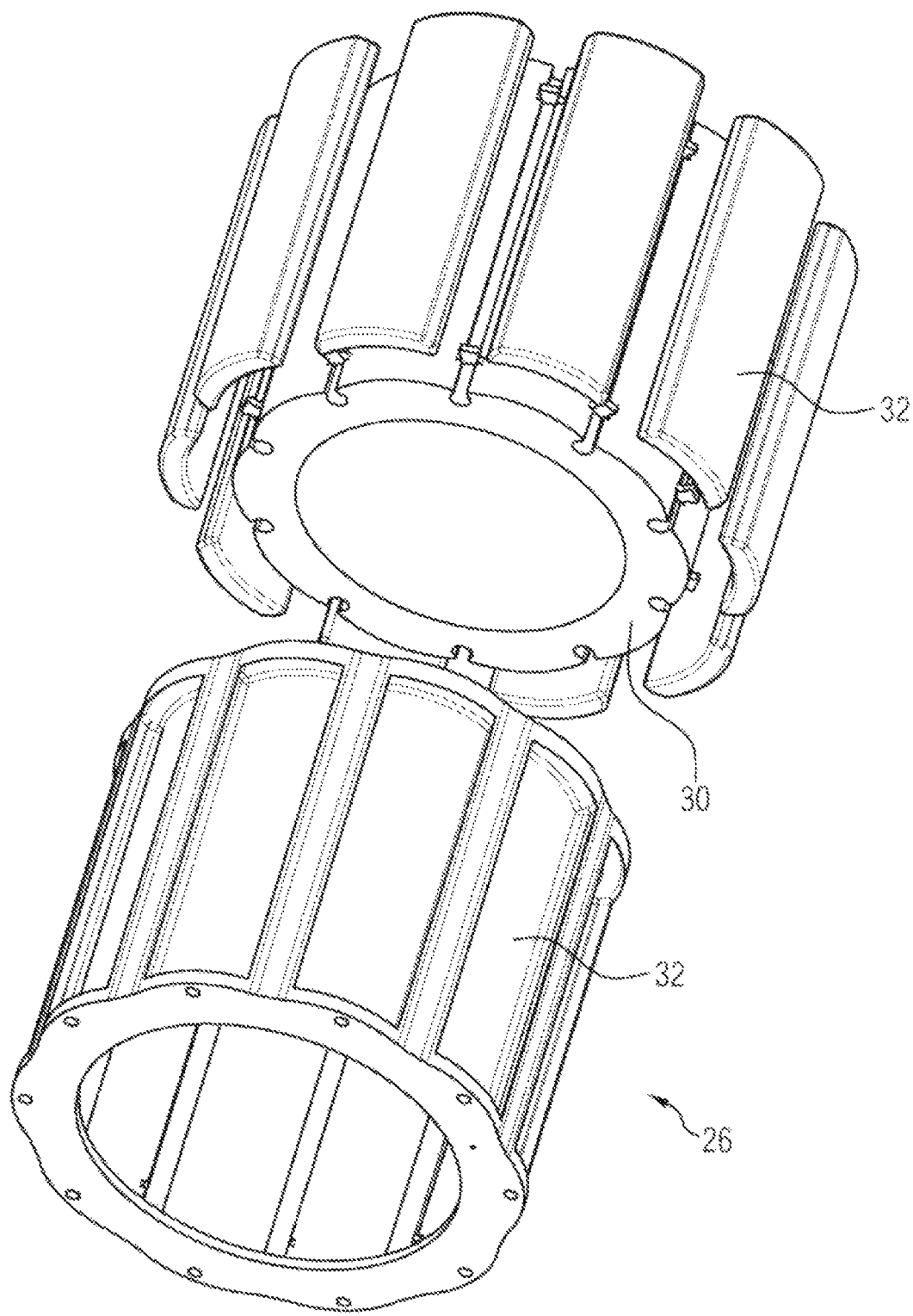
FIG. 5 is a perspective illustration of a rotor of the electric drive shown in FIG. 1.
Figure 7:
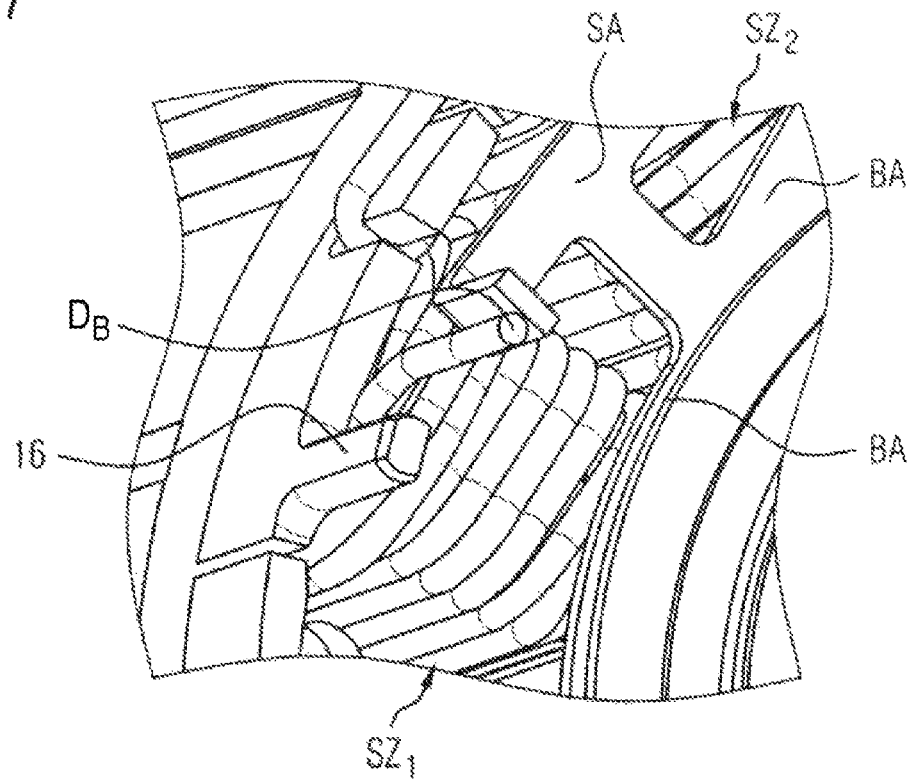
FIG. 7 is an enlarged perspective illustration of an internal contacting of the coil shown in FIG. 4.

FIG. 2 and FIG. 7 in conjunction with FIGS. 10A-10F illustrate that two adjacent contact sections of the total of four second contact sections $U_{II}$, $V_{II}$, $W_{II}$, which are provided for each contact element $KE_U$, $KE_V$, $KE_W$ and which, as such, are integrally formed on the base section BA via an assigned web section SA, connect a wire beginning $D_B$ of one of the wire windings $DW_U$, $DW_V$, $DW_W$ to a wire end $D_E$ of an adjacent wire winding $DW_U$, $DW_V$, $DW_W$. These two adjacent wire windings $DW_U$, $DW_V$, $DW_W$ belong to one of the three phases U, V, W (cf. FIG. 4).

Furthermore, individual pin-like anchoring sections 16, made of plastic, of the stator 18 also protrude from the end face and are integrally formed on the stator 18 and extend through the housing insert 8 through associated openings in the housing insert 8. These plastic anchoring sections 16 are caulked with the housing insert 8 in a form-fitting manner, for example by what is known as hot caulking.

To stiffen the housing 4, it is possible, in the region of the flange 6, for bulge regions that are evenly spaced apart from one another to be provided in the housing sheet metal, in each of which regions a bulge oriented radially inward is formed. In the region of the respective bulges, a fastening hole is also formed in the flange in order to be able to attach the housing 4 to the housing of the electrohydraulic brake system.

The stator 18 is joined to the housing 4 in a clamping manner. The permanently magnetized rotor 26 enclosed by the stator 18 comprises a tube 28 which is press-connected to a hub 30. The hub 30 carries an arrangement of a plurality of permanent magnets 32 in the form of shell magnets, which interact as such with the coil 20. The tube 28 is also laser-welded at one of its two ends to a bearing bush 36, which as such extends through an angular-contact ball bearing 34 which functions as a "fixed bearing" and via which the tube 28 is received in the region of one end of the housing 4. The tube 28 is also received by a ball bearing 38, which functions as a "floating bearing" and is received in a centering manner by the housing insert 8. The housing insert 8 presses against the ball bearing 38 or its outer ring via a, for example, annular spring element 24—for example in the form of a corrugated spring—which is enclosed as such by the housing insert 8. The spring element 24 can be connected to the housing insert 8 in an integrally bonded manner by being correspondingly concomitantly encapsulated during the plastic encapsulation of the housing insert 8. Furthermore, the housing insert 8 covers the stator-rotor unit 18, 26 in the sense of a shield or housing and bearing shield.

In summary, the housing insert 8 combines the following functions:
receiving and centering of the floating bearing 38;
bracing of the floating bearing 38;
internal and external contacting of the coil 20;
form-fitting connection with the stator 18; and
covering of the stator-rotor unit 18, 26.

The integration of all these functions in the separate housing insert 8 is associated with a reduction in manufacturing costs and simplified assembly of such an electric drive 2. In addition, there is a very compact design of the electric drive 2.

The proposed housing insert 8 also reduces the length tolerances to be taken into account in the longitudinal direction X-X of the electric drive 2 (reduction of a length tolerance chain).

In addition, the integration of the contact arrangement 22 in the housing insert 8 results in a very compact or very tight arrangement of the individual wire windings $DW_U$, $DW_V$, $DW_W$, forming the coil 20, in the housing 4 (compact or tight "packaging"), because a plastic encapsulation which encloses a section—for example an end section of the stator 18—and which as such encompasses said contact arrangement is dispensed with.

The stator 18, which is arranged clamped in the housing 4, comprises, for example, an annular arrangement of a total of twelve magnetizable, pole-forming stator teeth $SZ_1$, $SZ_2$ ... $SZ_{11}$, $SZ_{12}$. These stator teeth $SZ_1$, $SZ_2$ ... $SZ_{11}$, $SZ_{12}$ are subdivided into separate tooth pairs $SZ_1$ & $SZ_2$, $SZ_3$ & $SZ_4$ ... $SZ_{11}$ & $SZ_{12}$, with each of the tooth pairs $SZ_1$ & $SZ_2$, $SZ_3$ & $SZ_4$ ... $SZ_{11}$ & $SZ_{12}$ being wrapped with its own common metal wire forming a part of the coil 20 (cf. FIG. 3 and FIG. 4). The two wire ends $D_B$, $D_E$ of the respective tooth pairs (FIG. 3) are electrically contacted with the housing insert 8 described above.

The individual stator teeth $SZ_1$, $SZ_2$ ... $SZ_{11}$, $SZ_{12}$ are composed of individual sheet metal layers to form a laminated core. The individual laminated cores are held together by means of an embossing which is produced as such by means of a punch in a longitudinal extent X-X of the laminated core. The embossing extends over the entire longitudinal extent X-X of the respective laminated core, so that a form fit is created between the individual sheet metal layers that holds the sheet metal layers together.

The individual stator teeth $SZ_1$, $SZ_2$ ... $SZ_{11}$, $SZ_{12}$ are overmolded with a coil carrier made of plastic with the formation of a first panel $P_i$ (i=inner) in the region of the first end face of the stator tooth and overmolded with the formation of a second panel $P_o$ (o=outer) in the region of the second end face of the stator tooth. The first end panel $P_i$ faces the rotor 26 in an installed position of the stator 18, whereas the second end panel $P_o$ faces away from the rotor 26 in the installed position of the stator 18. Therefore, the first panel $P_i$ can also be referred to as the inner panel, and the second panel $P_o$ can also be referred to as the outer panel. The wire winding $DW_U$, $DW_V$, $DW_W$ assigned to the respective stator tooth and belonging to the coil 20 is enclosed between the panel $P_i$ and the panel $P_o$. The coil carrier can be injection-molded in such a way that it either completely or only partially envelops the respective stator tooth (cf., for example, FIG. 3).

Figure 3:
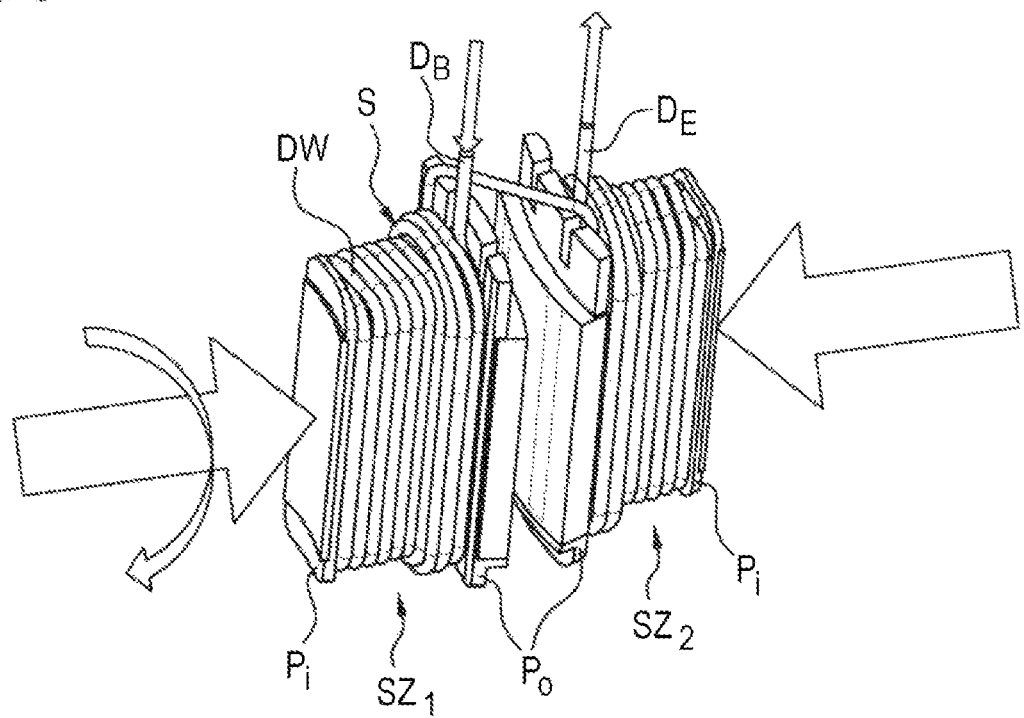
FIGS. 3A and 3B are a perspective illustration of an arrangement of two stator teeth forming a tooth pair.
Figure 3:
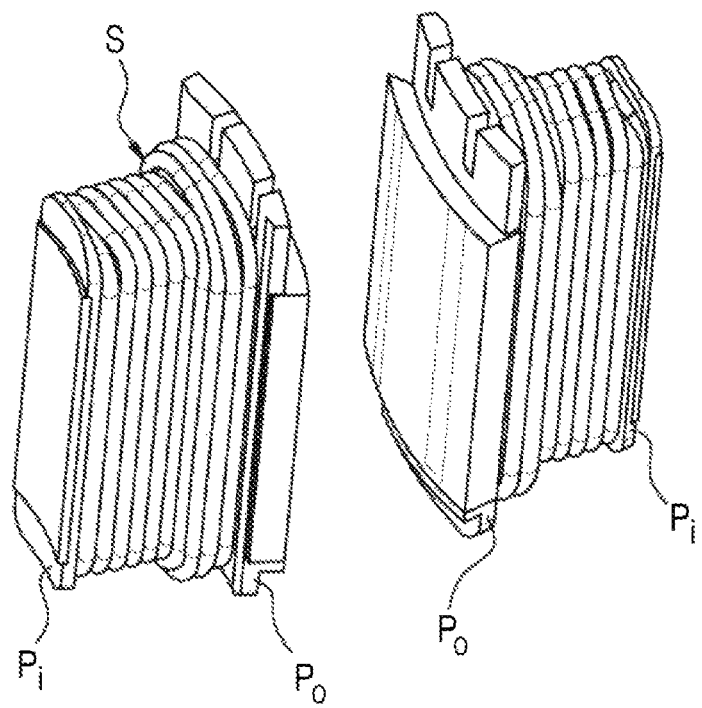

FIG. 3 illustrates an arrangement of two stator teeth $SZ_1$, $SZ_2$ which form a tooth pair and which are arranged opposite one another for joint wrapping with a metal wire in such a way that initially the outer ends in the use position of the tooth pair—or the second end faces—are opposite one another.

Wrapping occurs here in such a way that in relation to one of the two teeth—here $SZ_1$— the wrapping is counterclockwise, whereas in relation to the other tooth—here $SZ_2$— the wrapping is clockwise. Furthermore, the wrapping is such that between the respective first and second panel $P_i$, $P_o$ a gradation S in the wire winding $DW_U$, $DW_V$, $DW_W$ is formed, with the outer wire winding section facing the panel $P_o$ being tighter in relation to that situated to the inside thereof, or inner wire winding section. For this reason, the panel $P_o$ is also designed to be longer than the panel $P_i$. After the wrapping, the two stator teeth $SZ_1$, $SZ_2$ are pivoted relative to one another (cf. arrow representation in FIG. 3) in order to finally be able to be inserted into the housing 4 according to the illustration in FIG. 4. Accordingly, in the embodiment described, to be understood by way of example, a total of six tooth pairs $SZ_1$ & $SZ_2$, $SZ_3$ & $SZ_4$ ... $SZ_{11}$ & $SZ_{12}$ are inserted into the housing 4 one after the other. The individual stator teeth $SZ_1$, $SZ_2$ ... $SZ_{11}$, $SZ_{12}$ are braced against one another in the housing 4 while lying on one another and are braced against the housing 4.

Figure 8:
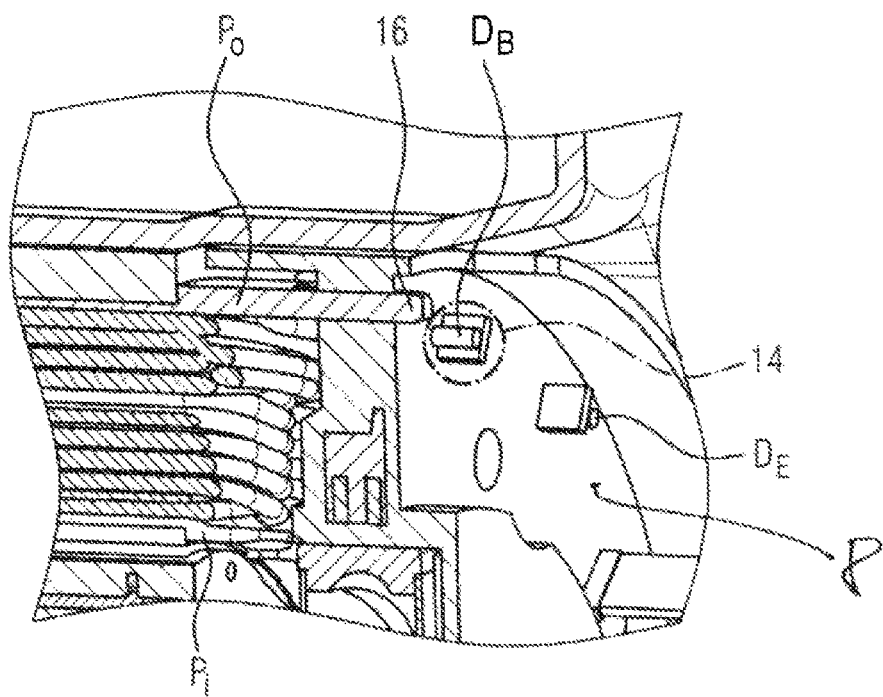
FIG. 8 is an enlarged perspective illustration of a connection between the housing insert shown in FIG. 1 and the coil shown in FIG. 4.
Figure 9A:
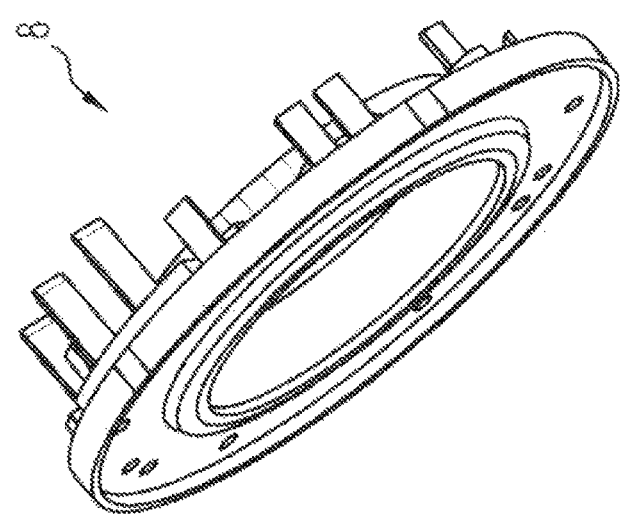
FIGS. 9A and 9B show two perspective views of the housing insert.
Figure 9B:
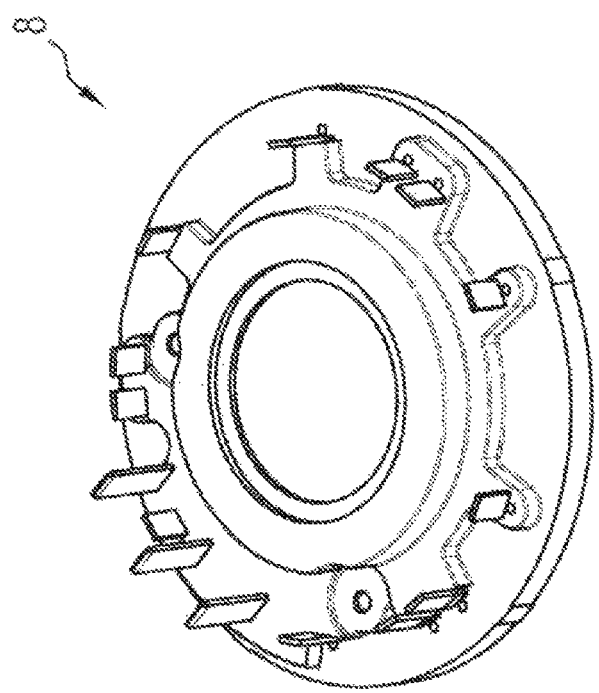
Figure 10A:
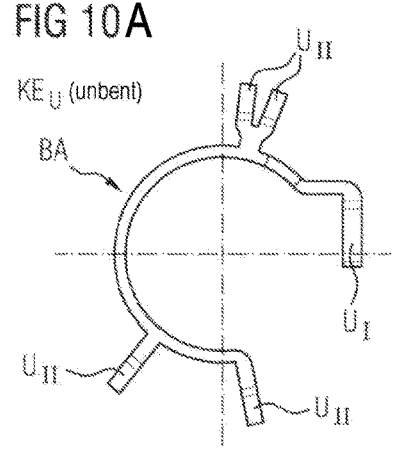
FIGS. 10A-10F show three contact elements of the housing insert with unbent and bent first and second contact sections.
Figure 10B:
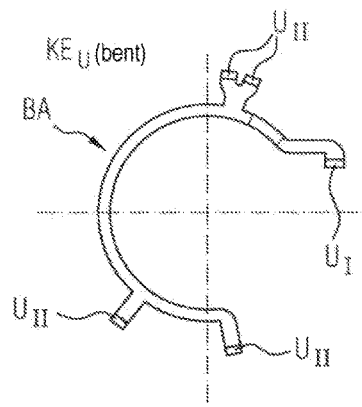
Figure 10C:
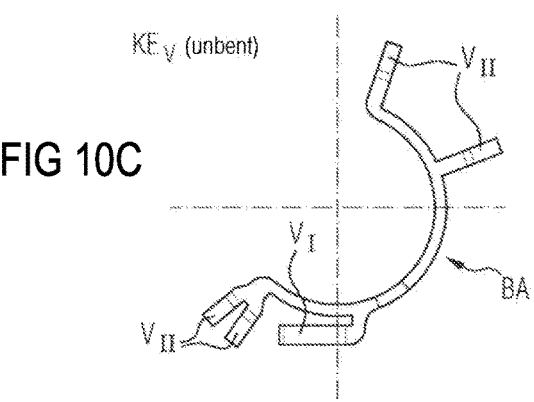
Figure 10D:
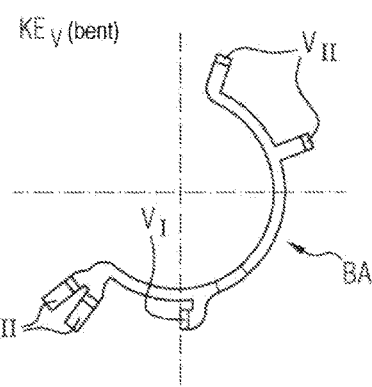
Figure 10E:
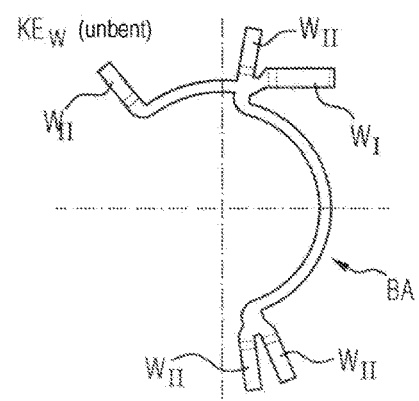
Figure 10F:
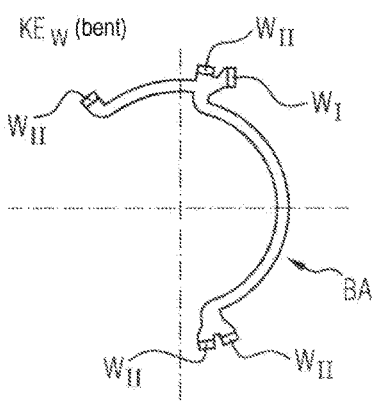

Integrally formed on the individual coil carriers on the side of the respective panel $P_o$ is a pin-like anchoring section 16, also called anchoring dome, which is encapsulated with the coil carrier, protrudes from the panel $P_o$ in a longitudinal direction X-X of the electric drive 2 and as it were constitutes a local extension of the panel $P_o$ (cf. FIG. 7 and FIG. 8). This anchoring section 16 extends—as already described above—through an associated opening in the housing insert 8 beyond an end face of the housing insert 8 facing away from the stator-rotor unit 18, 26, which end face has the anchoring section 16 engaging behind it for the purpose of a form fit. Reference is made at this point to the previously mentioned hot caulking of the individual anchoring sections 16, by which a nonreleasable form fit between the housing insert 8 and the stator 18 is brought about.

The individual wire ends $D_B$, $D_E$ of the tooth pairs $SZ_1$ & $SZ_2$, $SZ_3$ & $SZ_4$ ... $SZ_{11}$ & $SZ_{12}$ are routed in the longitudinal direction X-X of the electric drive 2 through associated openings in the housing insert 8 beyond said end face of the housing insert 8 facing away from the stator-rotor unit 18, 26 and electrically contacted with the housing insert 8 via respectively assigned contact sections $U_{II}$, $V_{II}$, $W_{II}$. The contact is such that in each case a wire beginning $D_B$ of one of the wire windings $DW_U$, $DW_V$, $DW_W$ is connected to a wire end $D_E$ of an adjacent wire winding $DW_U$, $DW_V$, $DW_W$ by the contact arrangement 22 enclosed by the housing insert 8, specifically via one of said contact elements $KE_U$, $KE_V$, $KE_W$. These respectively adjacent and interconnected wire windings $DW_U$, $DW_V$, $DW_W$ belong to one of the three phases U, V, W.

The proposed coil design also contributes to a very compact or very tight arrangement of the individual wire windings $DW_U$, $DW_V$, $DW_W$ forming the coil 20 (compact or tight "packaging"). In conjunction with the proposed housing insert 8, the result is a very compact electric drive 2, which can also be easily produced and assembled. The electric drive 2 can also be produced inexpensively.

Although exemplary embodiments have been discussed in the above description, it should be noted that numerous modifications are possible. Furthermore, it should be noted that the exemplary embodiments are merely examples which are not intended to limit the scope of protection, the applications and the design in any way. Instead, the above description gives a person skilled in the art a guideline for the implementation of at least one exemplary embodiment, with it being possible for various changes to be made, especially with regard to the function and arrangement of the component parts described, without departing from the scope of protection resulting from the claims and combinations of features equivalent thereto.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electric drive for an electrohydraulic brake system, comprising:
    a housing;
    a stator-rotor unit received in the housing;
    a separate housing insert made of a plastic, which is joined to the housing and is contacted with a stator of the stator-rotor unit; and
    a contact arrangement of at least two spaced-apart, electrically conducting contact elements for electrical supply of at least two phases of a coil of the stator enclosed the housing insert,
    each contact element having:
        a partially circular base section;
        a single, first contact section is arranged on the partially circular base section and configured for external contacting of the stator; and four second contacts, each arranged on the partially circular base section and configured to contact a respective coil,
wherein the contact elements are electrically insulated from one other by the plastic.

2. The electric drive as claimed in claim 1, wherein the contact elements have first contact sections are configured for external contacting of the stator with a plug and second contact sections for internal contacting of the stator with respective contact elements.

3. The electric drive as claimed in claim 2, wherein the first contact sections and the second contact sections protrude in a longitudinal direction of the electric drive from an end face of the housing insert facing away from the stator-rotor unit.

4. The electric drive as claimed in claim 1, wherein the housing insert is connected to the stator in a form-fitting manner.

5. The electric drive as claimed in claim 4, wherein individual pin-like anchoring sections made of plastic and integrally formed on the stator extend in a longitudinal direction of the electric drive through respectively associated openings in the housing insert beyond an end face of the housing insert facing away from the stator-rotor unit and engage behind the end face.

6. The electric drive as claimed in claim 5, wherein the plastic anchoring sections are caulked with the housing insert.

7. The electric drive as claimed in claim 1, wherein the housing insert receives, centers, and braces a bearing of a rotor of the stator-rotor unit.

8. The electric drive as claimed in claim 7, wherein the housing insert presses against the bearing via a spring element, which is enclosed by the housing insert.

9. The electric drive as claimed in claim 1, wherein the contact arrangement has three spaced-apart, electrically conducting contact elements for electrical supply of three phases of the coil.

10. The electric drive as claimed in claim 1, wherein the plastic of the housing insert is overmolded.

11. The electric drive as claimed claim 1, wherein the housing is a deep-drawn metal sheet.

12. The electric drive as claimed in claim 1, wherein the electric drive is integrated in an electrohydraulic brake system of a vehicle.

13. A brake system comprising:
an electric drive for an electrohydraulic brake system, comprising:
a housing;
a stator-rotor unit received in the housing;
a separate housing insert made of a plastic, which is joined to the housing and is contacted with a stator of the stator-rotor unit; and
a contact arrangement of at least two spaced-apart, electrically conducting contact elements for electrical supply of at least two phases of a coil of the stator enclosed the housing insert,
each contact element having:
a partially circular base section;
a single, first contact section is arranged on the partially circular base section and configured for external contacting of the stator; and
four second contacts, each arranged on the partially circular base section and configured to contact a respective coil,
wherein the contact elements are electrically insulated from one other by the plastic,
wherein the stator-rotor unit displaces a piston of a cylinder-piston arrangement to generate a brake pressure.

14. A vehicle comprising:
a brake system comprising:
an electric drive for an electrohydraulic brake system, comprising:
a housing;
a stator-rotor unit received in the housing;
a separate housing insert made of a plastic, which is joined to the housing and is contacted with a stator of the stator-rotor unit; and
a contact arrangement of at least two spaced-apart, electrically conducting contact elements for electrical supply of at least two phases of a coil of the stator enclosed the housing insert,
each contact element having:
a partially circular base section;
a single, first contact section is arranged on the partially circular base section and configured for external contacting of the stator; and
four second contacts, each arranged on the partially circular base section and configured to contact a respective coil,
wherein the contact elements are electrically insulated from one other by the plastic,
wherein the stator-rotor unit displaces a piston of a cylinder-piston arrangement to generate a brake pressure.

15. The electric drive as claimed in claim 1, wherein the stator-rotor unit is configured to displace a piston of a cylinder-piston arrangement in order to generate a brake pressure.

16. The electric drive as claimed in claim 8, wherein the spring element is an annular spring element.

17. The electric drive as claimed in claim 1, wherein the four second contacts extend radially from the partially circular base section.

* * * * *